United States Patent [19]

Nichols et al.

[11] Patent Number: 5,240,970
[45] Date of Patent: Aug. 31, 1993

[54] QUATERNARY AMMONIUM CARBOXYLATE INNER SALT COMPOSITIONS AS CONTROLLED ACTIVITY CATALYSTS FOR MAKING POLYURETHANE FOAM

[75] Inventors: James D. Nichols, Fogelsville; Ann C. L. Savoca, Bernville; Mark L. Listemann, Whitehall, all of Pa.

[73] Assignee: Air Products and Chemicals, Inc., Allentown, Pa.

[21] Appl. No.: 1,977

[22] Filed: Jan. 8, 1993

[51] Int. Cl.$^5$ ............... C08G 18/16; C08J 9/12; C08J 9/14
[52] U.S. Cl. ............... 521/128; 521/130; 521/170; 521/902; 544/193
[58] Field of Search ............... 521/128, 130, 170, 902; 544/193

[56] References Cited

U.S. PATENT DOCUMENTS

| | | | |
|---|---|---|---|
| 3,127,404 | 3/1964 | Mascioli | 260/268 |
| 3,193,515 | 7/1965 | Mascioli | 260/2.5 |
| 3,862,150 | 1/1975 | Bechara et al. | 260/268 |
| 4,040,992 | 8/1977 | Beschara et al. | 260/2.5 AW |
| 4,086,081 | 2/1992 | Savoca et al. | 521/103 |
| 4,111,914 | 9/1978 | Krests et al. | 528/48 |
| 4,335,219 | 6/1982 | Clarke et al. | 521/128 |
| 4,503,226 | 3/1985 | Tang et al. | 544/193 |
| 4,542,214 | 9/1985 | Bechara | 544/107 |
| 4,780,485 | 10/1988 | Ashida | 521/902 |
| 4,904,629 | 2/1990 | Galla et al. | 502/164 |

FOREIGN PATENT DOCUMENTS 7504995 9/1976 France .

OTHER PUBLICATIONS

Goldberg, Yuri, et al. "Betaines Derived from Amino and Hydrazino Acids As Phase Transfer Catalysts" Tetrahedron, vol. 46, No. 6.

Rahal, Said, and Leila Badache "An Anomalius Eschweiler-Clarke Reaction" Tetrahedron Letters, vol. 32, No. 31, pp. 3847-3848, 1991.

Kasai, Naoya, and Kazahiko Sakaguchi "An Efficient Synthesis of CrO-rarnitine" Tetrahedron Letters, vol. 33, No. 9, pp. 1211-1212, 1992.

*Primary Examiner*—Morton Foelak
*Attorney, Agent, or Firm*—Michael Leach; James C. Simmons; William F. Marsh

[57] ABSTRACT

A method for preparing a polyurethane foam which comprises reacting an organic polyisocyanate and a polyol in the presence of a blowing agent, cell stabilizer and a catalyst composition which comprises a quaternary ammonium carboxylate inner salt having the following formula I

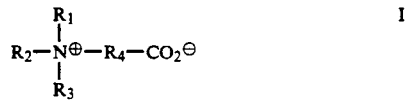

where $R_1$-$R_3$ are independently $C_1$-$C_{12}$ alkyl, $C_5$-$C_8$ cycloalkyl or a heterocycle, $C_6$-$C_{10}$ aryl or heteroaromatic. $R_1$ and $R_2$ or $R_1$-$R_3$ together with the nitrogen atom can also be part of nitrogen containing ring system such as piperdine, morpholine, triethylenediamine, imidazole, or 1,8-diazabicyclo-[5.4.0]-undec-7-ene. $R_4$ is a divalent $R_1$.

6 Claims, No Drawings

QUATERNARY AMMONIUM CARBOXYLATE INNER SALT COMPOSITIONS AS CONTROLLED ACTIVITY CATALYSTS FOR MAKING POLYURETHANE FOAM

FIELD OF THE INVENTION

The present invention relates to the use of quaternary ammonium salts as catalysts for producing polyurethanes.

BACKGROUND OF THE INVENTION

In the production of polyurethanes, it is often desirable to control the activity of the catalyst(s). The effect of controlled catalysis may be realized in improved reactivity profiles, for instance, delayed initiation or accelerated cure. Such reaction rate control is of particular importance to the polyurethane molder, where it is important that the polyisocyanate/polyol mixture remain flowable for sufficient time to fill the mold properly, while maintaining or improving demold time. Controlled catalysis can also affect product distributions and significantly impact physical properties of the final polyurethane part.

Latent activity is generally achieved through the use of thermally activated "blocked" catalysts. An example is the ammonium salt prepared from a tertiary amine and a carboxylic acid (U.S. Pat. No. 3,862,150). The disadvantage of such a material is mainly corrosivity, but poor master batch stability has also been reported. A related structure is prepared from triethylenediamine and a glycol borate acid (U.S. Pat. No. 3,193,511; U.S. Pat. No. 3,127,404; FR 2,301,554). An ammonium salt of a quaternary borate results. The advantage of such a catalyst composition is delayed activity and/or accelerated cure. U.S. Pat. No. 5,086,081 describes reduced odor amine-boron compositions prepared from tertiary amine polyurethane catalysts and boric acid. These compositions also impart improved reactivity during the production of polyurethane parts. U.S. Pat. No. 4,542,214 describes the composition and synthesis of tertiary amine salts of substituted carbamic and carbonic acids, and their use as delayed action polyurethane catalysts.

Latent activity/accelerated cure has been noted for quaternary ammonium carboxylate salts prepared from triethylenediamine and ethylene oxide or propylene oxide in the presence of protic acid (U.S. Pat. No. 4,904,629; see also U.S. Pat. No. 4,040,992). Quaternary ammonium carboxylates are generally known to catalyze the trimerization of polyisocyanates (U.S. Pat. No. 4,503,226 and references cited therein).

Quaternary ammonium areneoxide zwitterions (U.S. Pat. No. 4,335,219) and sulfonium zwitterions (U.S. Pat. No. 4,111,914) have been used as catalysts for polyurethane reactions.

Quaternary ammonium carboxylate inner salts (zwitterions) have been prepared. The synthesis of (R)-carnitine (*Tetrahedron Lett.* 1992, 33, 1211-1212), betaine product from an anomalous Eschweiler-Clarke reaction (Tetrahedron Lett. 1991, 23, 3847-3848), and betaines derived from amino and hydrazino acids (Tetrahedron 1990, 46, 1911-1922) are examples.

SUMMARY OF THE INVENTION

The present invention provides a composition for catalyzing the trimerization of an isocyanate and/or the reaction between an isocyanate and a compound containing a reactive hydrogen, e.g. the urethane reaction for making polyurethane. The catalyst composition consists essentially of a quaternary ammonium carboxylate inner salt, preferably such salt of the following formula I:

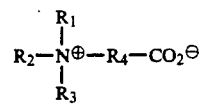

where $R_1$, $R_2$ and $R_3$ are independently $C_1-C_{12}$ alkyl, $C_5-C_8$ cycloalkyl, $C_6-C_{10}$ aryl, or such alkyl, cycloalkyl or aryl group containing a heteroatom, $R_1$ and $R_2$ or $R_1$, $R_2$ and $R_3$ together with the nitrogen atom can also compose a nitrogen containing $C_3-C_{12}$ ring system. $R_4$ is a divalent $R_1$. Preferred catalyst compositions comprise $R_1$, $R_2$ and $R_3$ together with the nitrogen atom composing triethylenediamine and $R_4$ being as $C_1-C_{12}$ alkylene group.

As an advantage of these catalyst compositions there is a significant improvement in reactivity during the production of a polyurethane. Most notably, these materials provide delayed initiation. They are unexpectedly potent after being activated and can provide accelerated cure rates.

DETAILED DESCRIPTION OF THE INVENTION

The catalyst composition according to the invention can catalyze (1) the reaction between an isocyanate functionality and an active hydrogen-containing compound, i.e. an alcohol, a polyol, an amine or water, especially the urethane (gelling) reaction of polyol hydroxyls with isocyanate to make polyurethanes and the blowing reaction of water with isocyanate to release carbon dioxide for making foamed polyurethanes, and/or (2) the trimerization of the isocyanate functionality to form polyisocyanurates.

The polyurethane products are prepared using any suitable organic polyisocyanates well known in the art including, for example, hexamethylene diisocyanate, phenylene diisocyanate, toluene diisocyanate ("TDI") and 4,4'-diphenylmethane diisocyanate ("MDI"). Especially suitable are the 2,4-and 2,6-TDI's individually or together as their commercially available mixtures. Other suitable isocyanates are mixtures of diisocyanates known commerically as "crude MDI", also known as PAPI, which contain about 60% or 4,4'-diphenylmethane diisocyanate along with other isomeric and analogous higher polyisocyanates. Also suitable are "prepolymers" of these polyisocyanates comprising a partially prereacted mixture of a polyisocyanates and a polyether or polyester polyol.

Illustrative of suitable polyols as a component of the polyurethane composition are the polyalkylene ether and polyester polyols. The polyalkylene ether polyols include the poly(alkylene oxide) polymers such as poly(ethylene oxide) and poly(propylene oxide) polymers and copolymers with terminal hydroxyl groups derived from polyhydric compounds, including diols and triols; for example, among other, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane and like low molecular weight polyols.

In the practice of this invention, a single high molecular weight polyether polyol may be used. Also, mixtures of high molecular weight polyether polyols such as mixtures of di- and trifunctional materials and/or different molecular weight or different chemical composition materials may be used.

Useful polyester polyols include those produced by reacting a dicarboxylic acid with an excess of diol, for example, adipic acid with ethylene glycol or butanediol, or reacting a lactone with an excess of a diol such as caprolactone with propylene glycol.

In addition to the polyether and polyester polyols, the masterbatches, or premix compositions, frequently contain a polymer polyol. Polymer polyols are used in polyurethane foam to increase the foam's resistance to deformation, i.e. to increase the load-bearing properties of the foam. Currently, two different types of polymer polyols are used to achieve load-bearing improvement. The first type, described as a graft polyol, consists of a triol in which vinyl monomers are graft copolymerized. Styrene and acrylonitrile are the usual monomers of choice. The second type, a polyurea modified polyol, is a polyol containing a polyurea dispersion formed by the reaction of a diamine and TDI. Since TDI is used in excess, some of the TDI may react with both the polyol and polyurea. This second type of polymer polyol has a variant called PIPA polyol which is formed by the in-situ polymerization of TDI and alkanolamine in the polyol. Depending on the load-bearing requirements, polymer polyols may comprise 20-80% of the polyol portion of the masterbatch.

Other typical agents found in the polyurethane foam formulations include chain extenders such as ethylene glycol and butanediol; crosslinkers, such as diethanolamine, diisopropanolamine, triethanolamine and tripropanolamine; blowing agents such as water, methylene chloride, trichlorofluoromethane, and the like; and cell stabilizers such as silicones.

A general polyurethane flexible foam formulation having a 1-3 lb/ft$^3$ (16-48 kg/m$^3$) density (e.g., automotive seating) containing the catalyst composition according to the invention would comprise the following components in parts by weight (pbw):

| Flexible Foam Formulation | |
|---|---|
| | Parts by Weight |
| Polyol | 20-80 |
| Polymer Polyol | 80-20 |
| Silicone Surfactant | 1-2.5 |
| Blowing Agent | 2-4.5 |
| Crosslinker | 0.5-2 |
| Catalyst | 0.5-2 |
| Isocyanate Index | 70-115 |

A general polyurethane microcellular foam formulation having a 12-40 lb/ft$^3$ density (192-640 kg/m$^3$), e.g., shoe sole, integral skin, containing the catalyst composition according to the invention would comprise the following components in parts by weight (pbw):

| Microcellular Foam Formulation | |
|---|---|
| | Parts by Weight |
| Polyol | 85 |
| Silicone Surfactant | 0.1-1 |
| Blowing Agent | 0.1-2 |
| Chain extender | 1-10 |
| Catalyst | 0.5-4 |
| Isocyanate Index | 80-120 |

The urethane catalyst composition consists essentially of a quaternary ammonium carboxylate inner salt of the following formula I $$R_2-\underset{\underset{R_3}{|}}{\overset{\overset{R_1}{|}}{N^\oplus}}-R_4-CO_2^\ominus \qquad I$$

where $R_1 R_2$ and $R_3$ are independently $C_1$-$C_{12}$ alkyl, $C_5$-$C_8$ cycloalkyl, $C_6$-$C_{10}$ aryl or such alkyl, cycloalkyl or aryl group containing a heteroatom such as a nitrogen or oxygen. Either $R_1$ and $R_2$ or $R_1$, $R_2$ and $R_3$ together with the nitrogen atom can be a nitrogen containing ring system which may contain a heteroatom such as nitrogen or oxygen and/or a hydroxy functionality. $R_4$ is a divalent $R_1$, i.e., $C_1$-$C_{12}$ alkylene, $C_5$-$C_8$ cycloalkylene or $C_6$-$C_{10}$ arylene.

Suitable $R_1$, $R_2$ and $R_3$ groups on the nitrogen would include, for example, methyl, ethyl, propyl, butyl, lauryl, N,N-dimethylaminoethyl, N,N-dimethylaminopropyl and the like; cyclopentyl, cyclohexyl and the like; and phenyl, p-tolyl and the like. Illustrative nitrogen containing ring systems formed by the nitrogen atom with the $R_1$ and $R_2$ groups or the $R_1$, $R_2$ and $R_3$ groups would comprise, for example, piperidine, morpholine, triethylenediamine, 3-quinuclidinol, imidazole or 1,8-diazabicyclo-[5.4.0]-undec-7-ene.

Illustrative carboxyorgano groups ($-R_4-CO_2^\ominus$) on the nitrogen atom of Formula I would include, for example, carboxymethyl ($R_4$ is $-CH_2-$), carboxyethyl ($R_4$ is $-CH_2CH_2-$), carboxypropyl $R_4$ is $-CH_2Ch_2C-H_2-$), carboxyethyl ($R_4$ is $-C_6H_4-$) and the like.

Exemplary of quaternary ammonium carboxylate inner salt catalysts are the zwitterionic reaction products of tertiary amines and haloalkyl carboxylates such as sodium chloroacetate, sodium 3-bromopropionate, tetra-n-butylammonium chloroacetate and the like; lactones such as γ-butyrolactone, β-propiolactone and the like; and unsaturated carboxylic acids or carboxylates such as acrylic acid, sodium acrylate and the like. Suitable tertiary amines in these reactions include, for example, trimethylamine, dimethylcyclohexylamine, triethylenediamine, quinuclidine, 3-quinuclidinol, imidazole, morpholine, 1,8-diazabicyclo[5.4.0]undec-7-ene and the like.

Also exemplary of suitable catalysts are amino acid betaines obtained by alkylation of the amino acid nitrogen. These would include, for example, glycine betaine, γ-butyrobetaine, carnitine, trigonelline, stahydrine, 4-hydroxyproline betaine and the like.

A catalytically effective amount of the catalyst compositions is used in the polyurethane formulation. More specifically, suitable amounts of the catalyst composition may range from about 0.01 to 10 parts per 100 parts polyol in the polyurethane formulation.

In addition, the quaternary ammonium carboxylate inner salt catalyst compositions may be used in combination with other tertiary amine, organotin, and carboxylate urethane catalysts well known in the urethane art.

These catalyst compositions have the advantage of improved reactivity during the production of a polyurethane. Most notably, these materials provide delayed initiation. The are unexpectedly potent after being activated and can provide accelerated cure rates.

EXAMPLE 1

This example shows the preparation of a zwitterion product from triethylenediamine and tetra-n-butylammonium chloroacetate. The tetra-n-butylammonium chloroacetate was prepared from chloracetic acid (1.9 g; 20 mmole) and tetra-n-butylammonium hydroxide (20 mL of a 1.0 M methanolic solution; 20 mmole) in solvent tetrahydrofuran (20 mL). Triethylenediamine (2.2 g; 20 mmole) was added and dissolution occurred within several minutes. A white precipitate formed over 20 hr. The precipate was collected and dried to afford 1.6 g of the zwitterion product 1 as a white powder. An additional 1.0 g of product was isolated from the filtrate and dried. The second crop was estimated to be 96% pure (contaminated with tetra-n-butylammonium chloride) by $^1$H NMR analysis.

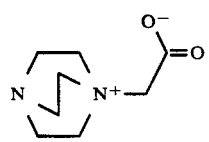

1

EXAMPLE 2

This example shows and alternate preparation of the zwitterion 1 from triethylenediamine and sodium chloroacetate. Triethylenediamine (56 g; 50 mmole) was dissolved in ethylene glycol (100 g) in a water cooled vessel. Sodium chloroacetate (58 g; 50 mmole) was added in six portions over 3 hr maintaining an internal reaction temperature of 68°-70° C. After stirring for an additional 72 hr, the sodium chloride was removed by filtration. Analysis of the ethylene glycol solution showed 51 wt % ethylene glycol, 40 wt % zwitterion 1, 1.4 wt % bis-zwitterion 2, 1.7 wt % triethylenediamine, and 5.7 wt % sodium chloride.

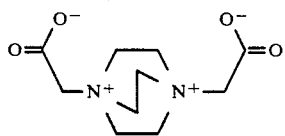

2

EXAMPLE 3

This example shows the preparation of a zwitterion product from triethylenediamine and tetra-n-butylammonium 3-bromopropionate. The tetra-n-butylammonium 3-bromopropionate was prepared from 3-bromopropionic acid (3.0 g; 20 mmole) and tetra-n-butylammonium hydroxide (20 mL of a 1.0 M methanolic a solution; 20 mmole) in solvent tetrahydrofuran (20 mL). Triethylenediamine (2.2 g; 20 mmole) was added and dissolution occurred within several minutes. Minimal precipitation occurred after stirring for 20 hr. The reaction solution was triturated with diethyl ether (60 mL and the product was filtered and dried to afford 1.2 g of the zwitterion product 3 as a white powder. The product purity was estimated to be 96% by $^1$H NMR (contaminant was tetra-n-butylammonium chloride).

An additional 0.9 g of product was isolated from the filtrate and dried. The second crop was estimated to be 92% pure by $^1$H NMR.

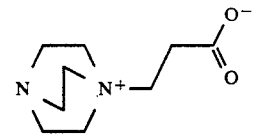

3

EXAMPLE 4

This example shows the preparation of a zwitterion product from triethylenediamine and γ-butyrolactone. Triethylenediamine (21 g; 185 mmole) was combined with γ-butyrolactone (99 g; 1150 mmole) and heated to 90° C. for 60 hr during which time a precipitate formed. The reaction was cooled, filtered and the product dried to afford 26 g of the zwitterionic product 4 as a white powder.

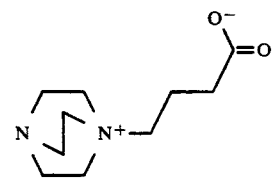

4

EXAMPLE 5

This example shows the preparation of a zwitterion product from 3-quinuclidinol and γ-butyrolactone. 3-Quinuclidinol (1.29 g; 10 mmole) was combined with γ-butyrolactone (62. g; 72 mmole) and heated to 85° C. for 7 hr during which time a precipitate formed. The reaction was cooled, filtered and the product dried to afford 1.0 g of the zwitterionic product 5 as a white powder.

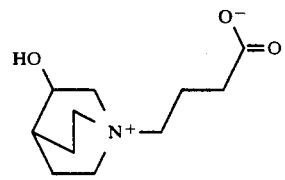

5

EXAMPLE 6

This example shows the relative rise height vs time for flexible foams prepared using Example 1 and Example 4 zwitterions in combination with triethylenediamine. A polyurethane foam formulation premix was prepared from the following in parts by weight (pbw):

| | |
|---|---|
| Voranol CP6001 (EO-tipped polyether polyol) | 100 pbw |
| Diisopropanolamine (85 wt % in water) | 1.0 pbw |
| Goldschmidt B4113 (silicone surfactant) | 1.0 pbw |

Control foams were prepared using 0.8 parts per hundred parts polyol (pphp) and 0.5 pphp DABCO 33-LV ® catalyst (33 wt % TEDA in DPG). For the zwitterion catalyzed foams, an equimolar amount of zwitterion was used to replace 0.3 pphp of the DABCO 33LV catalyst in the 0.8 pphp DABCO 33-LV catalyst control foam. For each foam, catalyst (as specified in Table 1) and water (enough to being the total system water to 2.9 pphp) were added to 135.9 g of above premix in a 5" (12.7 cm) diameter, 10" (25.4 cm) tall paper can and the formulation was mixed well for 20 sec. Sufficient diphenylmethane diisocyanate (Mondur MR; 31.5% NCO) was added to make a 100 NCO index foam (NCO index=mole NOC/mole active hydrogen×100) and mixed well for 4 sec. The foam was allowed to rise freely, monitoring foam height with time.

TABLE 1

| Catalyst | Amount | Free Rise Foam Height (cm) | | | | | |
|---|---|---|---|---|---|---|---|
| | | 25 sec | 50 sec | 100 sec | 150 sec | 200 sec | 350 sec |
| 0.8 DABCO 33-LV | 1.04 g | 2.54 | 8.13 | 21.6 | 25.7 | 25.1 | 24.4 |
| 0.5 DABCO 33-LV | 0.65 g | 2.29 | 3.56 | 9.40 | 15.2 | 18.5 | 21.6 |
| Example 1 Zwitterion[a] 0.5 DABCO 33-LV | 0.69 g 0.65 g | 2.29 | 4.32 | 12.2 | 19.1 | 22.9 | 24.1 |
| Example 4 Zwitterion[b] 0.5 DABCO 33-LV | 0.67 g 0.65 g | 2.54 | 4.57 | 12.2 | 19.3 | 23.6 | 25.4 |

[a] 33 wt % dissolved in dipropylene glycol
[b] 29 wt % dissolved in diethylene glycol These data clearly sow the delay in foam rise for the zwitterion catalyzed foams. These foams are comparable in rise height bs time to the 0.5 pphp DABCO 33-LV catalyst control foam for approximately the first minute. After this period, the rise height vs time is accelerated for the zwitterion containing foams. In fact, the zwitterion containing foams achieve maximum heights which surpass that of the 0.5 pphp DABCO 33-LV catalyst foam and are comparable to the 0.8 pphp DABCO 33-LV catalyst foam.

EXAMPLE 7

A more general and quantitative technique for measuring catalyst activity is given in this example. Here the relative catalytic activity of Examples 1 and 3-5 zwitterions is compared with a control catalyst, triethylenediamine. Reactivity data for an uncatlyzed run is also included. The rate of isocyanate consumption as a function of time was measured using a formulation similar to that of Example 6, but containing monofunctional reactants. Reaction samples drawn at the indicated times were quenched with dibutylamine and analyzed by liquid chromatography. The catalysts were compared on an equimolar basis corresponding to a loading of 0.35 pphp DABCO 33LV catalyst in an actual foam. Table 2 summarizes the results.

TABLE 2

| CATALYST/ TIME (min) | % NCO Conversion | | | | | | |
|---|---|---|---|---|---|---|---|
| | 0.5 | 1.0 | 2.0 | 3.0 | 4.0 | 6.0 | 8.0 |
| Uncatalyzed | 4.0 | 8.5 | 17.6 | 29.1 | 35.8 | 49.4 | 57.8 |
| Triethylenediamine | 14.2 | 28.9 | 50.3 | 64.1 | 71.6 | 79.9 | 83.6 |
| Example 1 Zwitterion | 5.5 | 10.5 | 20.4 | 35.2 | 64.3 | 83.6 | 89.5 |
| Example 3 Zwitterion | 4.4 | 7.2 | 20.2 | 37.1 | 54.8 | 71.3 | 77.7 |

TABLE 2-continued

| CATALYST/ TIME (min) | % NCO Conversion | | | | | | |
|---|---|---|---|---|---|---|---|
| | 0.5 | 1.0 | 2.0 | 3.0 | 4.0 | 6.0 | 8.0 |
| Example 4 Zwitterion | 4.3 | 8.8 | 29.0 | 88.0 | 90.6 | 92.0 | 93.6 |
| Example 5 Zwitterion | 4.1 | 8.5 | 20.0 | 83.7 | 93.4 | 93.4 | 93.9 |

These data show the quaternary ammonium carboxylate zwitterions to be relatively inactive during the early stages of the polyurethane forming process. In fact, the % NCO conversions resemble those obtained without catalysis for at least the first minute of reaction time. Surprisingly, these materials all become active between 1 and 3 min of reaction time. Example 1, Example 4, and Example 5 zwitterions are unexpectedly active after the initial dormant period.

EXAMPLE 8

This example shows the minimum achievable pull time (indication of cure) for microcellular foams prepared using Example 2 and Example 4 zwitterions in combination with triethylenediamine. Polyurethane premixes were prepared according to Table 3.

TABLE 3

| | Premix 1 | Premix 2 | Premix 3 |
|---|---|---|---|
| Desmophen 2001 KS (polyol) | 90.5 wt % | 90.3 wt % | 90.3 wt % |
| Water | 0.42 wt % | 0.42 wt % | 0.42 wt % |
| LK 221 (surfactant) | 0.42 wt % | 0.42 wt % | 0.42 wt % |
| Ethylene Glycol (chain extender) | 6.54 wt % | 6.06 wt % | 6.35 wt % |
| DABCO ED (33 wt % TEDA in DEG) | 2.21 wt % | 1.9 wt % | 1.9 wt % |
| Example 2 Zwitterion | | | 0.64 wt % |
| Example 4 Zwitterion[a] | | 0.91 wt % | |

[a] 33 wt % dissolved in ethylene glycol

The control catalyst formulation (Premix 1) contained only DABCO EG catalyst. For zwitterion catalyzed foams, 10 wt % of the DABCO EG catalyst in the control formulation was replaced with the test catalyst. A correction in DABCO EG catalyst level was made in premix 3 to account for the excess triethylenediamine contained in Example 2 zwitterion. Ethylene glycol was adjusted to a total of 7.9 wt % in each formulation. Foams were prepared from 105° C. premix and 108° C. diphenylmethane diisocyanate (Mondur E-501) using DESMA PSA53 mixing equipment. The NCO index at which minimum pull time could be achieved was determined in each case. Table 4 shows pull time vs index for each formulation.

TABLE 4

| NCO Index | Pull Time (sec) | | |
|---|---|---|---|
| | Premix 1 | Premix 2 | Premix 3 |
| 91 | 95 sec | | |
| 96 | 85 sec | 80 sec | |
| 100 | 80 sec | | |
| 102 | 130 sec | | |
| 105 | | 80 sec | |
| 110 | | 45 sec | 65 sec |
| 114 | | 25 sec | 50 sec |
| 119 | | 20 sec | 65 sec |
| 125 | | 60 sec | |

These data show that the minimum achievable pull time was improved when a portion of the control catalyst was substituted with the Example 2 and Example 4 zwitterions. With the control (Premix 1), a minimum pull time of less than 80 sec could not be achieved and, in fact, pull time increased dramatically above 100 NCO index. In contrast, the NCO index of the zwitterion containing foams could be increased substantially above 100 with a concommitant and substantial decrease in pull time (t 20 sec at 119 NCO index for Premix 2, Example 4 zwitterion; 50 sec at 114 NCO index for Premix 3, Example 2 zwitterion).

STATEMENT OF INDUSTRIAL APPLICATION

The present invention provides quaternary ammonium carboxylate inner salt compositions for use as controlled activity catalysts in making polyurethane foams.

We claim:

1. In a method for preparing a polyurethane foam which comprises reacting an organic polyisocyanate and a polyol in the presence of a blowing agent, cell stabilizer and a catalyst composition, the improvement which comprises employing as the catalyst composition a quaternary ammonium carboxylate inner salt having the following formula I

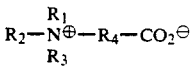

where
- $R_1$, $R_2$ and $R_3$ are independently $C_1$-$C_{12}$ alkyl, $C_5$-$C_8$ cycloalkyl, $C_6$-$C_{10}$ aryl or such alkyl, cycloalkyl or aryl group containing a heteroatom, or;
- $R_1$ and $R_2$, or $R_1$, $R_2$ and $R_3$ together with the nitrogen atom form a nitrogen containing ring system; and
- $R_4$ is a divalent $R_1$.

2. The method of claim 1 in which $R_1$, $R_2$ and $R_3$ are independently methyl, ethyl, propyl, butyl, lauryl, N,N-dimethylaminoethyl, N,N-dimethylaminopropyl, cyclopentyl, cyclohexyl, phenyl or p-tolyl, or $R_1$ and $R_2$ together with the nitrogen atom comprise piperdine, morpholine or imidazole, or $R_1$, $R_2$ and $R_3$ together with the nitrogen atom comprise triethylenediamine, 3-quinuclidinol or 1,8-diazabicyclo[5.4.0]undec-7-ene.

3. The method of claim 1 in which $R_1$, $R_2$ and $R_3$ comprise triethylenediamine.

4. The method of claim 1 in which $R_4$ is methylene, ethylene propylene or phenylene.

5. The method of claim 2 in which $R_4$ is methylene, ethylene, propylene or phenylene.

6. The method of claim 3 in which $R_4$ is methylene, ethylene or propylene.

* * * * *